United States Patent
Sim

[19]

[11] Patent Number: 6,166,720
[45] Date of Patent: Dec. 26, 2000

[54] COLOR LCD DRIVER WITH A YUV TO RGB CONVERTER

[75] Inventor: Soo-Seok Sim, Kyungsangbuk-Do, Rep. of Korea

[73] Assignee: LG Semicon Co., Ltd., Choongcheongbuk-Do, Rep. of Korea

[21] Appl. No.: 09/066,682

[22] Filed: Apr. 28, 1998

[30] Foreign Application Priority Data

Aug. 1, 1997 [KR] Rep. of Korea ...................... 97-36841

[51] Int. Cl.[7] .................................................. G09G 5/04
[52] U.S. Cl. ............................................................ 345/154
[58] Field of Search ................................... 345/153, 154, 345/155; 348/659, 660

[56] References Cited

U.S. PATENT DOCUMENTS

| | | | |
|---|---|---|---|
| 5,124,688 | 6/1992 | Rumball | 345/154 |
| 5,266,936 | 11/1993 | Saitoh | 345/98 |
| 5,784,050 | 7/1998 | Corry | 345/154 |
| 5,872,556 | 2/1999 | Rackley et al. | 345/154 |
| 5,914,728 | 6/1999 | Yamagishi et al. | 345/154 |
| 5,936,683 | 8/1999 | Lin | 345/154 |
| 5,999,164 | 12/1999 | Ito | 345/154 |

*Primary Examiner*—Bipin Shalwala
*Assistant Examiner*—David L Lewis
*Attorney, Agent, or Firm*—Morgan, Lewis & Bockius LLP

[57] ABSTRACT

YUV to RGB converter for converting a digital YUV signal having a Y signal, a U signal, and a V signal to a digital RGB signal having an R signal, a G signal, and a B signal according to equations:

$R = Y + N_1 \times V$ $G = Y - N_2 \times V - N_3 \times U$ $B = Y + N_4 \times U$ wherein the YUV to RGB converter performs only bit shifting and adding/subtracting operations, and $N_1$, $N_2$, $N_3$, and $N_4$ are constants.

19 Claims, 5 Drawing Sheets

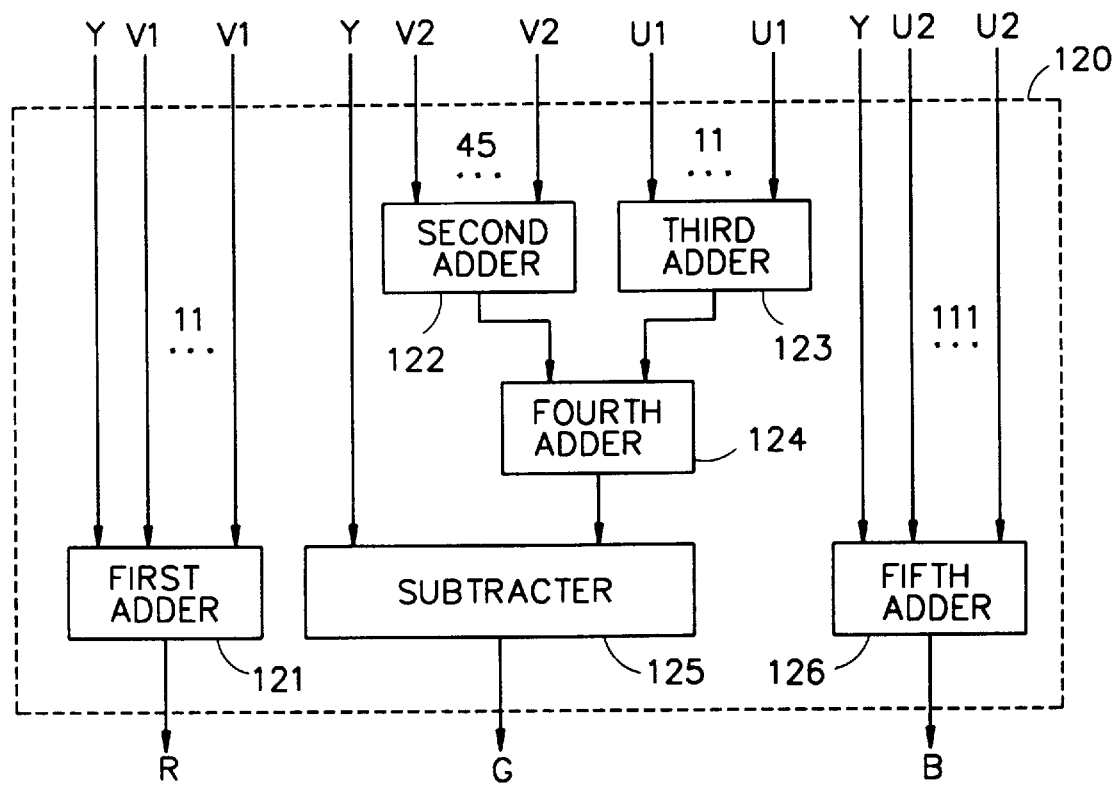

COLOR LCD DRIVER WITH A YUV TO RGB CONVERTER

This application claims the benefit of Korean patent application No. 36841/1997, filed Aug. 1, 1997, which is hereby incorporated by reference.

BACKGROUND OF THE INVENTION

1. Field of the Invention

The present invention relates to a color liquid crystal display (LCD) driver, and more particularly, to an improved color LCD driver with a YUV to RGB converter for converting data signals of a YUV type to data signals of a digital RGB type when an LCD controller transmits the data signals as the YUV type.

2. Discussion of the Related Art

The present invention relates to a number of methods for displaying a digital color image represented in a variety of methods, such as an RGB method for color computer graphics or a color TV, a YUV method for a broadcast system, a YIQ or YCrCb method, and a CMYK method for a color printer. The RGB method displays color using data signals of R (red), G(green), and B(blue). However, the YUV type displays color with a single Y signal (a luminance element), and U and V signals, which are chrominance elements.

As shown in FIG. 1, a conventional color LCD driver converts data signals of a digital RGB type outputted from an external LCD controller (not shown) into analog data signals, and then transmits the analog data signals to an LCD. The LCD driver comprises control logic 10 for outputting control signals which control input registers 20 in response to a control signal 20 received from the external LCD controller; the input registers 20 for sequentially storing the RGB data signals outputted from the external LCD controller according to the control signals outputted from the control logic 10; storage registers 30 for receiving and storing the RGB data signals stored in the input registers 20; a register string 40, wherein a plurality of resistances are connected serially, for selecting 64 points of the resistance having a desired voltage, thereby outputting voltage signals V0–V63 with 64 different levels in response to 9 voltage signals V0–V8 received from an external power supply; and a digital to analog converter (D/A converter) 50 for converting the digital RGB data signals stored in the storage registers 30 to analog data signals and then outputting the analog data signals to a column of an LCD panel (not shown) according to the 64 voltage signals outputted from the register string 40.

A data bus connected to an internal or external color LCD driver has a number of lines depending on the number of data bits corresponding to respective digital RGB data signals. That is, a data bus of 6 bits each for R (red), G (green), and B (blue), or 18 bits in total, is required to display 64 gray levels, and 8 bits each of R, G, and B, or 24 bits in total, are required to display 256 gray levels.

The operation of a conventional converter will now be described.

When the control signal and data signals of the RGB type received from the external LCD controller are inputted to the LCD driver, the control logic 10 outputs a control signal controlling the input registers 20 of the LCD driver. In response to the control signal outputted from the control logic 10, the input registers 20 sequentially store the digital RGB data signals received from the external LCD controller.

After the digital RGB data signals are sequentially stored in the input registers 20, the storage registers 30 receive the digital RGB data signals and store them.

The register string 40, however, selects 64 points of a resistance producing desired voltage therein, thereby outputting voltage signals V0–V63 with 63 different levels in response to 9 voltage signals V0–V8 outputted from an external power supply.

Finally, the D/A converter 50 selects a voltage corresponding to the digital RGB data signals stored in the storage registers 30 by using the 64 voltage signals V0–V63 outputted from the register string 40, thereby converting the digital RGB data signals stored into analog data signals and outputting the analog data signals to the column of the LCD panel.

The conventional color LCD driver, however, must have a data bus corresponding to a number of the data signals of R (red), G (green), and B (blue). In other words, a data bus of 6 bits of R (red), G (green), and B (blue), or 18 bits total, is required to display 64 gray levels, and a data bus of 8 bits each of R, G, and B, or 24 bits total, is required to display 256 gray levels. Therefore, the pin count of an IC package connected to the data bus is so high that electric wiring becomes complicated, and a great deal of EMI (electromagnetic interference) is produced.

SUMMARY OF THE INVENTION

Accordingly, the present invention is directed to a color LCD driver with a YUV to RGB converter that substantially obviates one or more of the problems due to the limitations and disadvantages of the related art.

An object of the present invention is to provide a color LCD driver with a YUV to RGB converter that uses only bit shifting and adding/subtracting operations.

Another object of the present invention is to minimize the number of bus lines needed for transferring color information between an LCD controller and an LCD driver.

Another object of the present is to reduce electromagnetic interference generated by color LCD controller/driver circuitry.

Additional features and advantages of the present invention will be set forth in the description which follows, and will be apparent from the description, or may be learned by practice of the invention. The objectives and other advantages of the invention will be realized and attained by. the structure and process particularly pointed out in the written description as well as in the appended claims.

To achieve these and other advantages and in accordance with the purpose of the present invention, as embodied and broadly described, in accordance with one aspect of the present invention there is provided a color liquid crystal display driver including a control circuit for outputting a control signal in response to an liquid crystal display controller, input registers for sequentially storing digital RGB data signals in response to the control signal, storage registers for receiving and storing the digital RGB data signals from the input registers, a register string for outputting voltage signals in response to external voltage signals and having different voltage levels, a digital to analog converter for converting the digital RGB data signals stored in the storage registers to analog data signals and outputting the analog data signals, a color liquid crystal display driver for driving an liquid crystal display panel, and a YUV to RGB converter for converting YUV data signals outputted from the liquid crystal display controller to the digital RGB data signals and outputting the digital RGB data signals to the input registers.

In another aspect of the present invention, there is provided a color liquid crystal display driver including a YUV to RGB converter for converting a digital YUV signal having a Y signal, a U signal, and a V signal to a digital RGB signal having an R signal, a G signal, and a B signal according to equations:

$R=Y+N_1 \times V$ $G=Y-N_2 \times V-N_3 \times U$ $B=Y+N_4 \times U$ wherein the YUV to RGB converter performs only bit shifting and adding/subtracting operations, and $N_1$, $N_2$, $N_3$, and $N_4$ are constants.

In another aspect of the present invention, there is provided a color liquid crystal display driver including a control circuit for outputting a control signal in response to a liquid crystal display controller, input registers for sequentially storing digital RGB data signals in response to the control signal, storage registers for receiving and storing the digital RGB data signals from the input registers, a register string for outputting a plurality of voltage signals in response to external voltage signals, a digital to analog converter for converting the digital RGB data signals stored in the storage registers to analog data signals and outputting the analog data signals, a color liquid crystal display driver for driving a liquid crystal display panel, a YUV to RGB converter for converting YUV data signals outputted from the liquid crystal display controller to the digital RGB data signals and outputting the digital RGB data signals to the input registers, and a YUV to RGB converter for converting a digital YUV signal having a Y signal, a U signal, and a V signal to a digital RGB signal having an R signal, a G signal, and a B signal according to equations:

$$R = Y + \frac{11}{8} \times V$$

$$G = Y - \frac{45}{64} \times V - \frac{11}{32} \times U$$

$$B = Y + \frac{111}{64} \times U$$

wherein the YUV to RGB converter performs only bit shifting and adding/subtracting operations.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention which together with the description serve to explain the principles of the invention.

In the drawings:

FIG. 6 is a block diagram of an adding/subtracting unit of FIG. 3.

DETAILED DESCRIPTION OF THE INVENTION

Reference will now be made in detail to the preferred embodiments of the present invention, examples of which are illustrated in the accompanying drawings.

In the present invention, color data is transmitted by using the YUV method, and, in addition, an LCD controller transmits the color data using the YUV method, rather than the RGB method.

Figure 1:
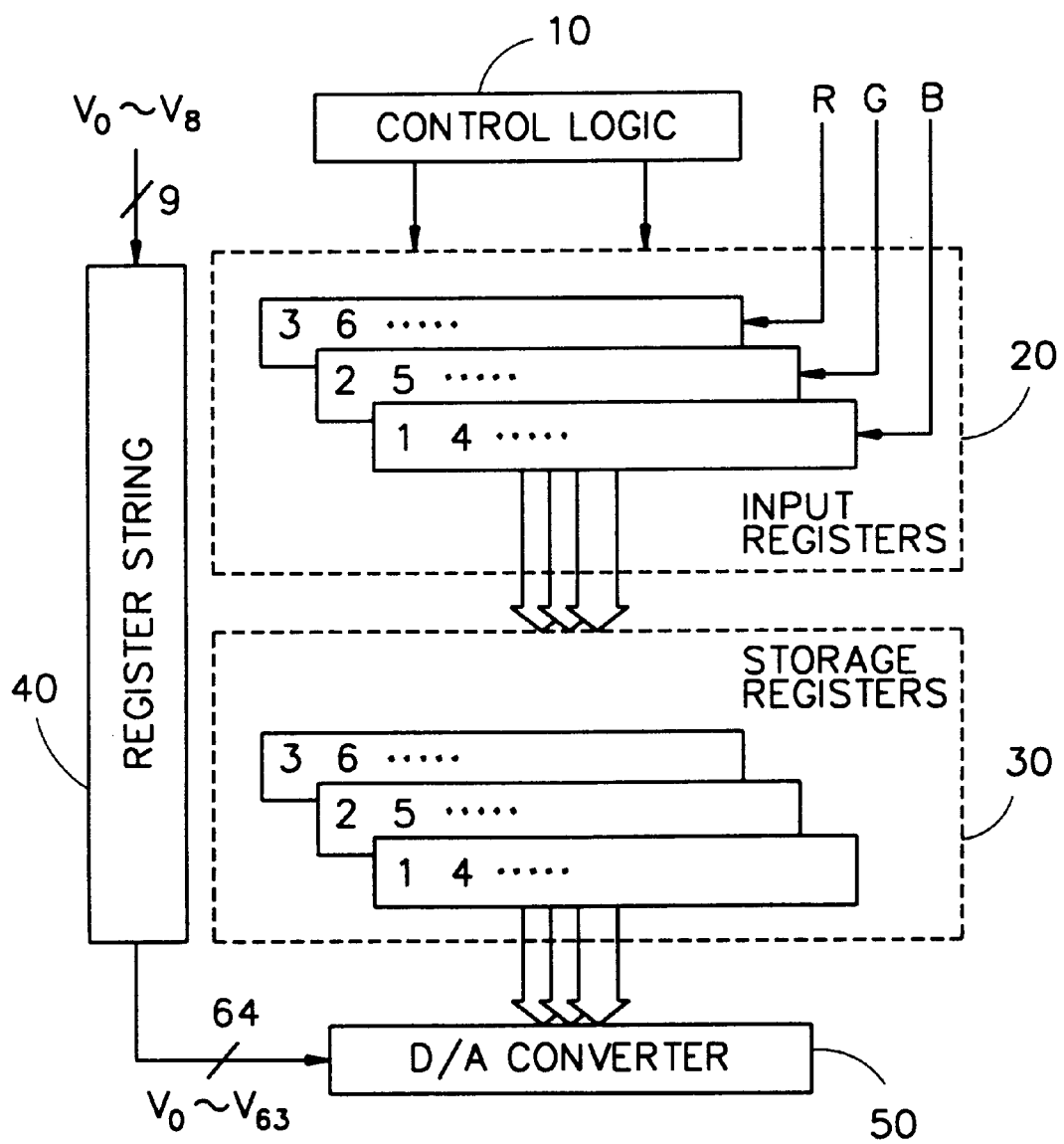
FIG. 1 is a block diagram of a conventional color LCD driver.
Figure 2:
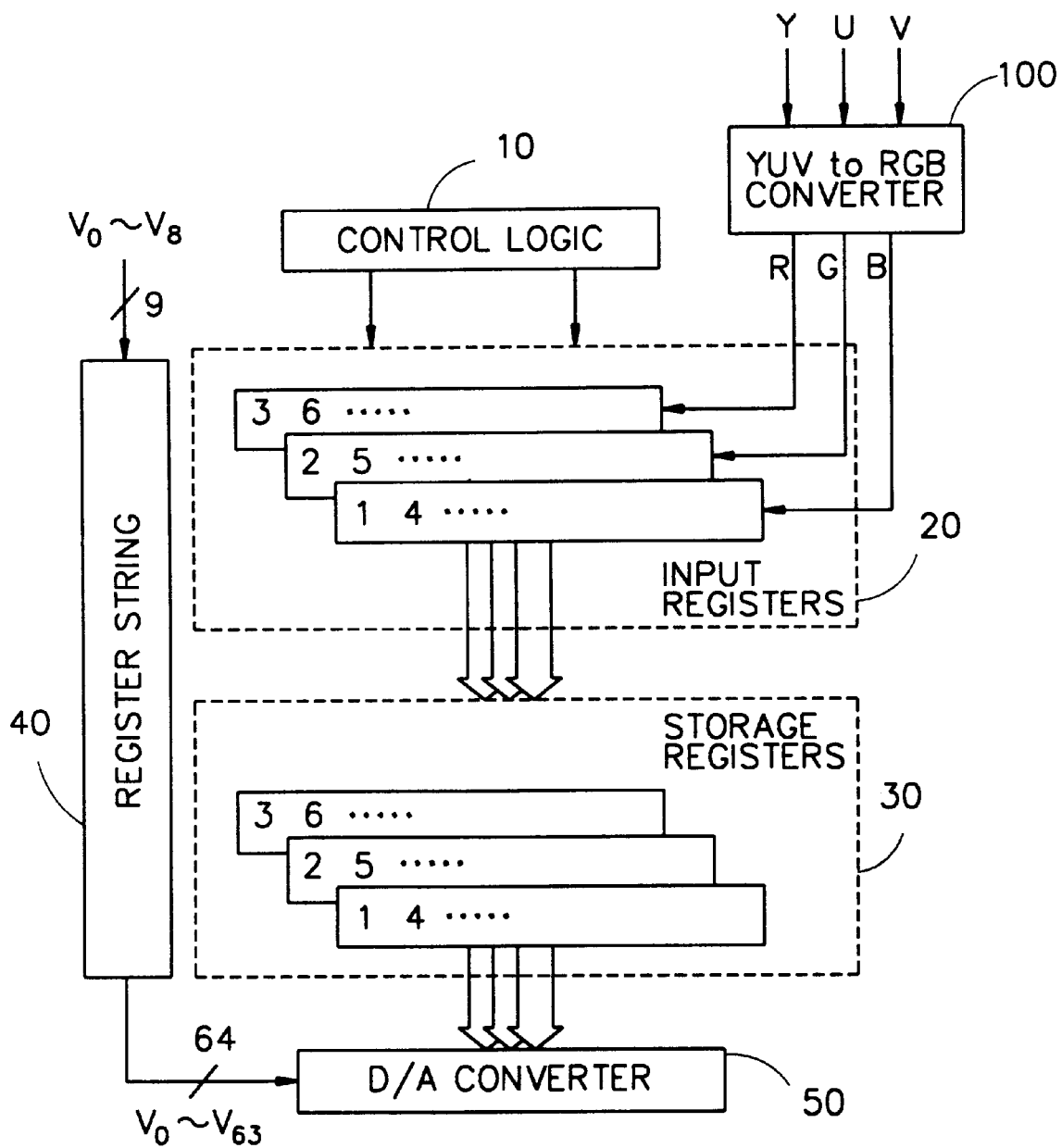
FIG. 2 is a block diagram of a color LCD driver with a YUV to RGB converter of the present invention.

Referring to FIG. 2, a color LCD driver includes a control logic 10 for outputting a control signal for controlling input registers 20 in response to the control signal outputted from an external LCD controller (not shown). The color LCD driver includes a YUV to RGB converter 100 for converting data signals of the YUV type received from the external LCD controller to data signals of the digital RGB type and outputs the data signals of the RGB type to the input registers 20. The input registers 20 sequentially store digital RGB data signals received from the YUV to RGB converter 100 according to the control signal outputted from the control logic 10. Storage registers 30 for receive and store the digital RGB data signals stored in the input registers 20. A register string 40, including for example a plurality of resistances connected in serial, selects 64 points of the resistance to establish desired voltage levels and outputs voltage signals V0–V63 with 64 different levels in response to 9 voltage signals V0–V8 received from an external power supply. A D/A converter 50 converts the digital RGB data signals stored in the storage registers 30 to analog data signals and outputs the analog data signals to a column of an LCD panel (not shown) according to the 64 voltage signals outputted from the register string 40.

Figure 3:
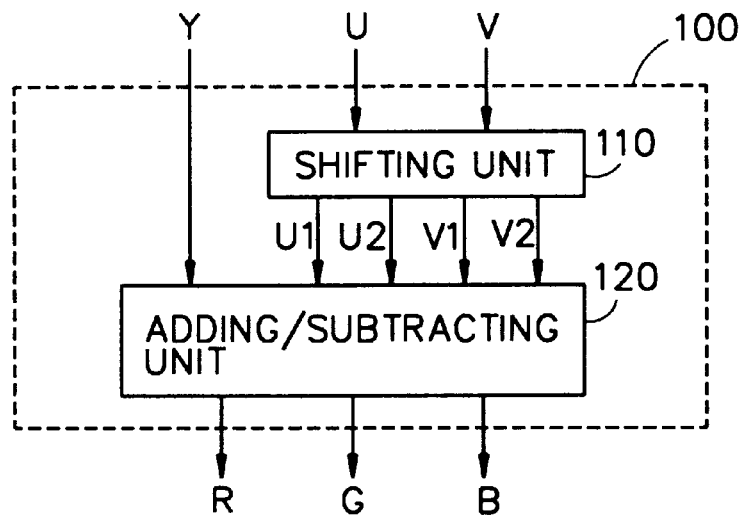
FIG. 3 is a block diagram of the YUV to RGB converter of FIG. 2.

Referring to FIG. 3, the YUV to RGB converter 100 includes a shifting unit 110 for shifting U and V signals from an external LCD controller by a certain bit number and outputting U1, U2, V1, and V2 signals. The YUV to RGB converter also includes an adding/subtracting unit 120 for performing adding or subtracting of the U1, U2, V1, and V2 signals and the Y signal, thereby converting the YUV type signals to digital data signals of the RGB type.

Figure 4:
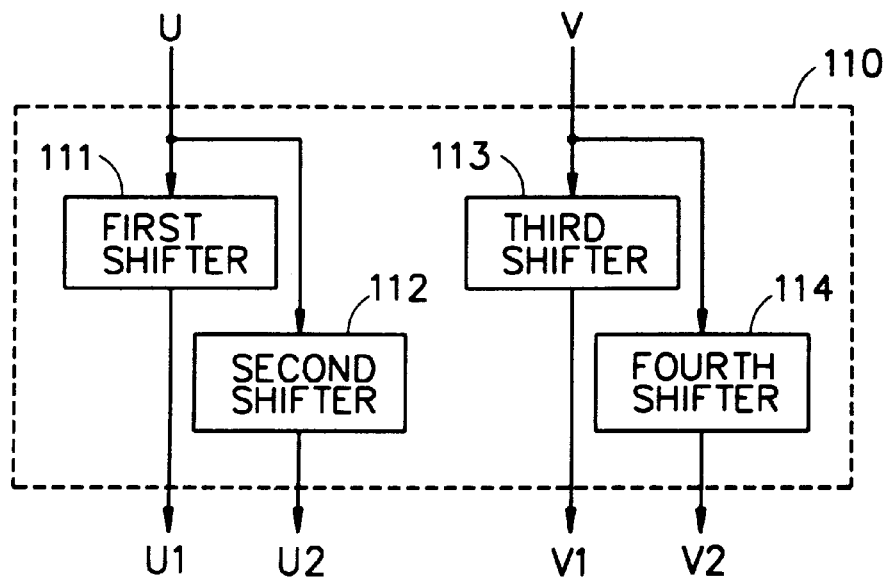
FIG. 4 is a block diagram of a shifting unit of FIG. 3.

The shifting unit 110, as shown in FIG. 4, includes a first shifter 111 for shifting the U signal by 5 bits, thereby outputting a U1 signal, a second shifter 112 for shifting the U signal by 6 bits, thereby outputting a U2 signal, a third shifter 113 for shifting the V signal by 3 bits, thereby outputting a V1 signal, and a fourth shifter 114 for shifting the V signal by 6 bits, thereby outputting a V2 signal. Here, the shifting by 5 bits, 6 bits, 3 bits and 6 bits in the first shifter 111, the second shifter 112, the third shifter 113, and the fourth shifter 114, respectively, is towards the least significant bit.

The adding/subtracting unit 120, as shown in FIG. 6, includes a first adder 121 for adding the V1 signal to itself 11 times and to the Y signal, thereby outputting an R (red) signal. The adding/subtracting unit also includes a second adder 122 for adding the V2 signal to itself 45 times. The adding/subtracting unit also includes a third adder 123 for adding the U1 signal to itself 11 times. The adding/subtracting unit also includes a fourth adder 124 for adding outputs of the second adder 122 and third adder 123. The adding/subtracting unit also includes a subtracter 125 for subtracting the output of the fourth adder 124 from the Y signal, thereby outputting a G (green) signal. The adding/subtracting unit also includes a fifth adder 126 for adding the U2 signal to itself 111 times and to the Y signal, thereby outputting a B (blue) signal.

The operation of the color LCD driver with YUV to RGB converter of the present invention will now be described.

As shown in FIGS. 3 through 6, when a data signal of a YUV type from the external LCD controller is transmitted to an LCD driver, the shifting unit 110 shifts the U signal by 5 and 6 bits, thereby outputting the U1 and U2 signals, respectively, and shifts the V signal by 3 and 6 bits, thereby outputting V1 and V2 signals, respectively.

Then, the adding/subtracting unit 120 adds the Y, U1, U2, V1, and V2 signals, and subtracts the U1, U2, V1, and V2 signals form the Y signal, thereby outputting data signals of the digital RGB type.

The process by which the data signals of the YUV type are converted to the data signals of the digital RGB type in the YUV to RGB converter 100 will now be described in detail.

The present invention relates to a method for an LCD driver for converting data signals of the YUV type to data signals of the digital RGB type when the external LCD controller transmits the data signals as the YUV type. The data signals of the YUV type can be converted to the digital RGB type data using the following equations:

$$R = Y + 1.375 \times V \quad (1)$$

$$G = Y - 0.703125 \times V - 0.34375 \times U \quad (2)$$

$$B = Y + 1.734375 \times U \quad (3)$$

The equations (1), (2), and (3) can be expressed in fractions as follows:

$$R = Y + \frac{11}{8} \times V \quad (1a)$$

$$G = Y - \frac{45}{64} \times V - \frac{11}{32} \times U \quad (2b)$$

$$B = Y + \frac{111}{64} \times U \quad (3c)$$

Here, in Formula (1a), the R signal is equal to the V signal divided by 8, added to itself 11 times, and then added to the Y signal. In Formula (2b), the G signal is equal to subtracting from the Y signal the V signal divided by 64 and then added to itself 45 times, and subtracting the U signal divided by 32 and then added to itself 11 times. In Formula (3c), the B signal is equal to the U signal by 64, added to itself 111 times, and then added to the Y signal. The constants 11/8, 45/64, 11/32 and 111/64 may be referred to as constants $N_1$, $N_2$, $N_3$, and $N_4$, respectively.

Shifting a binary value by a single bit is equivalent to dividing it by 2, shifting a binary value by 3 bits is equivalent to dividing it by 2×2×2=8, shifting a binary value by 5 bits is equvalent to dividing it by 32, and shifting a binary value by 6 bits is equivalent to dividing it by 64. The shifting by 3, 5, and 6 bits in the first to fourth shifters 111–114 shown in FIG. 4 is towards the least significant bit (LSB).

In other words, in the shifting unit 110 illustrated in FIG. 4, the first shifter 111 shifts the U signal by 5 bits and outputs the U1 signal that is equivalent to dividing the U signal by 32, and the second shifter 112 shifts the U signal by 6 bits and outputs the U2 signal that is equivalent to dividing the U signal by 64. The third shifter 113 shifts the V signal by 3 bits and outputs the V1 signal that is equivalent to dividing the V signal by 8. The fourth shifter 114 shifts the V signal by 6 bits and outputs the V2 signal that is equivalent to dividing the V signal by 64.

Figure 5A:
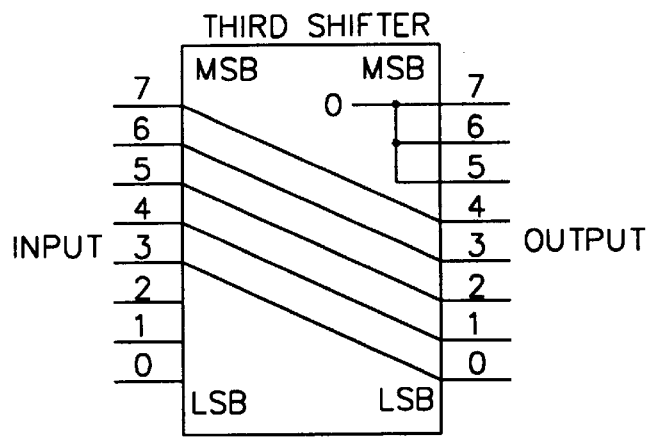
FIGS. 5A through 5C are detail block diagrams illustrating first to fourth shifters of FIG. 4.
Figure 5B:
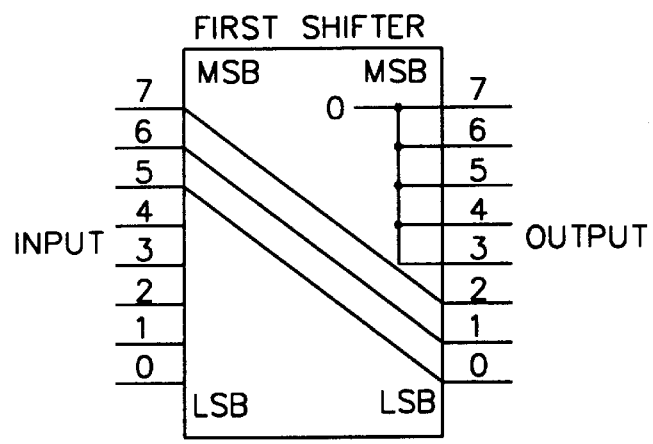
Figure 5C:
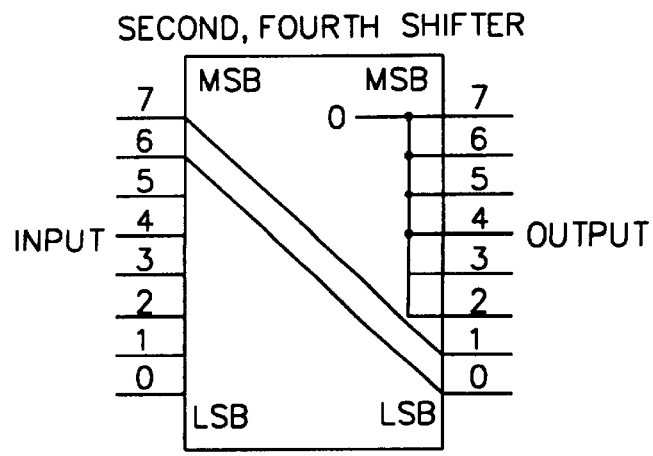

As shown in FIGS. 5A to 5C, the first, second, third and fourth shifters 111–114 shift the inputted data signals toward the least significant bit, then output the inputted data signals. FIGS. 5A, 5B, and 5C illustrate the third shifter 113 for shifting the inputted data by 3 bits, the first shifter 111 for shifting the inputted data by 5 bits, and the second and fourth shifters 112 and 114 for shifting the inputted data by 6 bits, respectively. In FIGS. 5A, 5B, and 5C, bits that are not connected to input terminals are called floating bits and are all tied to a logical "0".

In the adding/subtracting unit 120 shown in FIG. 6, first, the first adder 121 adds the V1 signal to itself 11 times and then adds the Y signal, thereby outputting the R signal. The second adder 122 adds the V2 signal outputted from the fourth shifter 114 of the shifting unit 110 to itself 45 times and outputs it. The third adder 123 adds the U1 signal outputted from the first shifter 111 to itself 11 times and outputs it. The fourth adder 124 adds together an output from the second adder 122 and an output from the third adder 123 and outputs it. Then, the subtracter 125 subtracts the output of the fourth adder 124 from the Y signal, thereby outputting the G signal.

The fifth adder 126 adds the U2 signal to itself 111 times and to the Y signal, thereby outputting the B signal.

Therefore, the data signals of the YUV type transmitted from the external LCD can be converted to the digital RGB type by a simple bit shifting operation of the data signals in the shifting unit 110 and an integer operation in the adding/subtracting unit 120, rather than by dividing, which is a more complex operation.

The digital data signals of the digital RGB type converted in the YUV to RGB converter 100 are stored in the input registers 20, passed through the storage registers 30, converted to analog data signals in the D/A converter 50, and then transmitted to the external LCD panel.

When the data signals of the RGB type are transmitted in the conventional art, each R, G, and B signal needs 6 or 8 lines of a data bus. In the present invention, however, the external LCD controller transmits color data signals as the YUV type, rather than the RGB type, so fewer bits are needed for the data bus.

When perceiving color, human vision is sensitive to luminance information, but generally insensitive to chrominance information. When the data signals are transmitted from the external LCD controller, the luminance information uses a data bus having more bits and the chrominance information uses a data bus having fewer bits.

Namely, in the YUV type, the Y signal is the luminance information (luminance) and the V signal is the chrominance information (chroma). The Y signal is transmitted on a data bus of 4 bits, and the U and V signals are transmitted on a data bus of 1 or 2 bits, and 4 bits, respectively.

Accordingly, when a ratio of Y:U:V=4:1:1 is satisfied, the lowest number of data bits needed is 6 bits. When the ratio of Y:U:V=4:2:2 is satisfied, the lowest number of data bits needed is 8 bits. When the ratio of Y:U:V=4:2:4 or Y:U:V=4:4:2 is satisfied, the lowest number of data bits needed is 10 bits. When the ratio of Y:U:V=4:4:4 is satisfied, the lowest number of data bits needed is 12 bits. Therefore, even when using a data bus having only 6 or 8, 10, and 12 bits, it is possible to transmit all the color data signals.

In addition, the YUV method can use memory more efficiently than the digital RGB method, and the number of connections needed for memory or other devices is smaller. Since the data signals of the digital RGB and the YUV method are both digital, converting between them is straightforward.

As described above, the YUV to RGB converter of the present invention converts a data signal of the YUV type into a data signal of the digital RGB type. By reducing the number of bits in the data bus between the LCD driver and the LCD controller, wiring can be done more easily. Also, electromagnetic interference can be reduced when transmitting the data signals.

Accordingly, when,color data signals are transmitted from the external LCD controller as the YUV type, the YUV to RGB converter according to the present invention converts the data signals of the YUV type to the digital RGB type, thereby reducing the pin number of a package as well as electromagnetic interference.

While the invention has been described in detail and with reference to specific embodiments thereof,-it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A color liquid crystal display driver comprising:
a control circuit for outputting a control signal;
a YUV to RGB converter for converting YUV data signals to digital RGB data signals and outputting the digital RGB data signals;
input registers for sequentially storing the digital RGB data signals in response to the control signal;
storage registers for receiving and storing the digital RGB data signals from the input registers;
a register string for outputting voltage signals in response to external voltage signals and having different voltage levels; and
a digital to analog converter for converting the digital RGB data signals stored in the storage registers to analog data signals and outputting the analog data signals,
wherein the YUV to RGB converter performs only bit shifting and adding/subtracting operations.

2. The color liquid crystal display driver of claim 1, wherein the YUV to RGB converter comprises:
a shifting unit for shifting U and V signals of the YUV data signals by a predetermined bit number, to produce selected intermediate signals; and
an adding/subtracting unit for substituting adding or subtracting the Y, U, V and intermediate signals to generate the digital RGB data signals.

3. The color liquid crystal display driver of claim 2, wherein the shifting unit and the adding/subtracting unit use a bit shifting operation and an integer operation to convert the YUV data signals to the digital RGB data signals.

4. The color liquid crystal display driver of claim 2, wherein the shifting unit comprises:
a first shifter for shifting the U signal by 5 bits to output a U1 signal;
a second shifter for shifting the U signal by 6 bits to output a U2 signal;
a third shifter for shifting the V signal by 3 bits lower to output a V1 signal; and
a fourth shifter for shifting the V signal by 6 bits to output a V2 signal.

5. The color liquid crystal display driver of claim 4, wherein the first, second, third and fourth shifters shift their respective inputs in a least significant bit direction.

6. The color liquid crystal display driver of claim 4, wherein the adding/subtracting unit comprises:
a first adder for adding the V1 signal to itself 11 times and then adding Y signal to generate a Red (R) signal;
a second adder for adding the V2 signal to itself 45 times to generate a first intermediate value;
a third adder for adding the U1 signal outputted to itself 11 times to generate a second intermediate value;
a fourth adder for adding the first and second intermediate values to generate a third intermediate value;
a subtracter for subtracting the third intermediate value from the Y signal to generate a Green (G) signal; and
a fifth adder for adding the U2 signal to itself 111 times and then adding the Y signal to generate a Blue (B) signal.

7. A color liquid crystal display driver comprising:
YUV to RGB converter for converting a digital YUV signal having a Y signal, a U signal, and a V signal to a digital RGB signal having an R signal, a G signal, and a B signal according to equations:

$$R=Y+N_1 \times V$$
$$G=Y-N_2 \times V-N_3 \times U$$
$$B=Y+N_4 \times U$$

wherein the YUV to RGB converter performs only bit shifting and adding/subtracting operations, and $N_1$, $N_2$, $N_3$, and $N_4$ are constants.

8. The color liquid crystal display driver of claim 7, further including a control circuit for outputting a control signal in response to a liquid crystal display controller.

9. The color liquid crystal display driver of claim 8, further including input registers for storing the digital RGB signals in response to the control signal.

10. The color liquid crystal display driver of claim 9, further including storage registers for receiving and storing the digital RGB data signals from the input registers.

11. The color liquid crystal display driver of claim 10, further including a register string for outputting selected voltage signals in response to external voltage signals.

12. The color liquid crystal display driver of claim 11, further including a digital to analog converter for converting the digital RGB signals to analog RGB signals in response to the digital RGB signals stored in the storage registers and the outputted voltage signals.

13. The color liquid crystal display driver of claim 12, further including a color liquid crystal display driver for driving a liquid crystal display.

14. The color liquid crystal display driver of claim 7, wherein the YUV to RGB converter comprises:
a shifting unit for shifting the U and V signals by a predetermined bit numbers, thereby outputting U1, U2, V1, and V2 signals; and
an adding/subtracting unit for adding or subtracting the Y, U1, U2, V1, and V2 signals for generating the digital RGB data signals.

15. The color liquid crystal display driver of claim 14, wherein the shifting unit comprises:
a first shifter for shifting the U signal by 5 bits to output the U1 signal;

a second shifter for shifting the U signal by 6 bits to output the U2 signal;

a third shifter for shifting the V signal by 3 bits to output the V1 signal; and a fourth shifter for shifting the V signal by 6 bits to output the V2 signal.

16. The color liquid crystal display driver of claim 15, wherein the first, second, third and fourth shifters shift their respective inputs in a least significant bit direction.

17. The color liquid crystal display driver of claim 16, wherein the adding/subtracting unit comprises; .

a first adder for adding the V1 signal to itself 11 times and then adding Y signal to generate the R signal;

a second adder for adding the V2 signal to itself 45 times to generate a first intermediate value;

a third adder for adding the U1 signal outputted to itself 11 times to generate a second intermediate value;

a fourth adder for adding the first and second intermediate values to generate a third intermediate value;

a subtracter for subtracting the third intermediate value from the Y signal to generate the G signal; and a fifth adder for adding the U2 signal to itself 111 times and then adding the Y signal to generate the B signal.

18. The liquid crystal display driver of claim 7, wherein:

$$N_1 = \frac{11}{8}; N_2 = \frac{45}{64}; N_3 = \frac{11}{32}; \text{ and } N_4 = \frac{111}{64}.$$

19. A color liquid crystal display driver comprising:

a control circuit for outputting a control signal in response to a liquid crystal display controller, a YUV to RGB converter for converting YUV data signals outputted from a liquid crystal display controller to digital RGB data signals and outputting the digital RGB data signals, and a YUV to RGB converter for converting a digital YUV signal having a Y signal, a U signal, and a V signal to a digital RGB signal having an R signal, a G signal, and a B signal according to equations:

$$R = Y + \frac{11}{8} \times V$$

$$G = Y - \frac{45}{64} \times V - \frac{11}{32} \times U$$

$$B = Y + \frac{111}{64} \times U$$

wherein the YUV to RGB converter performs only bit shifting and adding/subtracting operation;

input registers for receiving and storing the digital RGB data signals in response to the control signal;

storage registers for receiving and storing the digital RGB data signals from the input registers;

a register string for outputting a plurality of voltage signals in response to external voltage signals;

a digital to analog converter for converting the digital RGB data signals stored in the storage registers to analog data signals and outputting the analog data signals.

* * * * *